United States Patent [19]

Barsa et al.

[11] 4,423,204
[45] Dec. 27, 1983

[54] AMORPHOUS COPOLYAMIDE FROM LACTAM, DICARBOXYLIC ACID AND BISIMIDAZOLINE

[75] Inventors: Edward A. Barsa, East Haven; Kemal Onder, North Haven, both of Conn.

[73] Assignee: The Upjohn Company, Kalamazoo, Mich.

[21] Appl. No.: 414,507

[22] Filed: Sep. 2, 1982

[51] Int. Cl.$^3$ ............................................. C08G 69/14
[52] U.S. Cl. ................................... 528/323; 528/310; 528/324; 528/327; 528/312; 528/319
[58] Field of Search ................ 528/324, 323, 310, 327

[56] References Cited

U.S. PATENT DOCUMENTS

| | | | |
|---|---|---|---|
| 3,850,887 | 11/1974 | Halas et al. | 260/78 L |
| 3,926,924 | 12/1975 | Edgar et al. | 260/78 R |
| 3,933,762 | 1/1976 | Naito et al. | 260/78 L |
| 3,945,983 | 3/1976 | Hoppe et al. | 528/324 |
| 4,024,116 | 5/1977 | Horn et al. | 260/78 L |
| 4,072,665 | 2/1978 | Onder | 260/78 R |
| 4,087,481 | 5/1978 | Onder | 260/857 |
| 4,102,871 | 7/1978 | Horn et al. | 528/324 |
| 4,118,351 | 10/1978 | Murray et al. | 260/18 N |
| 4,196,108 | 4/1980 | Hinze et al. | 260/18 N |

FOREIGN PATENT DOCUMENTS 44-29265 11/1969 Japan .
44-29466 12/1969 Japan .
44-29467 12/1969 Japan .

OTHER PUBLICATIONS

Journal of Polymer Science: Part A-1, vol. 5 (1967), pp. 1129–1135, Kagiya et al.

*Primary Examiner*—Harold D. Anderson
*Attorney, Agent, or Firm*—James S. Rose; Denis A. Firth

[57] ABSTRACT

Novel amorphous copolyamides are provided which are the product of reaction of (A) a lactam, (B) a bisimidazoline, and (C) a dicarboxylic acid, wherein the proportions of reactants based on 100 mole percent are from about 43 to about 82 mole percent of lactam (A) and the remaining 18 to 57 mole percent divided between said (B) and said (C) in substantially equimolar proportions.

The copolyamides are characterized by better resistance to elevated temperatures than 100 percent polycaprolactam polyamides but at the same time are easily molded because of their amorphous character.

14 Claims, No Drawings

AMORPHOUS COPOLYAMIDE FROM LACTAM, DICARBOXYLIC ACID AND BISIMIDAZOLINE

BACKGROUND OF THE INVENTION

1. Field of the Invention

This invention relates to the preparation of copolyamides and is particularly concerned with amorphous lactam-imidazoline derived copolyamides.

2. Description of the Prior Art

Various types of polyamide polymers are known; see for example The Encyclopedia of Polymer Science and Technology, Vol. 10, p 347 et seq, 1969, Interscience Publishers, New York, N.Y. The various kinds of repeating units disclosed therein which are linked by the carbonamide group

determine the variation in physical properties observed for the different types of polyamides. Physical properties like melting point, solubility, and crystalline state are almost solely dependent on the type of repeating unit employed. For example, when all the repeating units are aromatic the polyamide has such a high melting point that melt processability, such as injection molding, is precluded because polymer decomposition begins to occur before the melt stage is ever reached. Alternatively, when the repeating units are mixed aliphatic-aromatic, as in the case of a polyamide prepared from an aliphatic dicarboxylic acid and an aromatic diamine, the polymer is injection-moldable but because of high crystallinity is brittle, opaque, and possessed of low elongation. In fact, when the dicarboxylic acid component is either adipic, pimelic or suberic acid, the corresponding polyamides have decomposition temperatures below their melting points. This behaviour precludes melt processing these polymers; see J. Polymer Sci. 10, Part A-1, p 1547, 1972. Finally, when the repeating units are all aliphatic as in nylon-6,6 or nylon-6 (polycaprolactam), the polymer is injection moldable but is limited in the end-use temperature to which it can be exposed.

T. Kagiya et al reported the formation of crystalline polyamides from bisimidazolines and dicarboxylic acids [Journal of Polymer Science: Part A-1, Vol. 5, pp 1129-1135 (1967)]. An advantageous feature of the polyamides prepared thereby was the avoidance of a dehydration step which is necessary when similarly constituted polyamides are prepared via the diamine-dicarboxylic acid route. This means of obtaining copolyamides was elaborated and expanded upon by Fuki et al., Japanese Application No. 44-29265, Nov. 28, 1969.

Further disclosures of the use of bisimidazolines in the formation of crystalline polyamides are to be found in Japanese Applications Nos. 44-29466 and 44-29467 (both published Dec. 1, 1969). In the former application bisimidazolines and bisdicarboxylic acid imides are copolymerized with water or a nylon salt (combination of a diamine and dicarboxylic acid in 1:1 molar proportions). In the latter application the bisimidazolines are co-reacted with bisdicarboxylic acid imides and aminocarboxylic acids.

Lactam polymerizations, an particularly the use of ε-caprolactam to prepare the nylon-6 type of polyamide, are very well known. Further, the use of caprolactam in the formation of caprolactam copolyamides is well known in the art. For example, for various combinations of caprolactam with aliphatic and aromatic dicarboxylic acids and diamines see U.S. Pat. Nos. 3,850,887; 3,926,924; 3,933,762; 4,024,116; 4,102,871; 4,118,351 and 4,196,108.

We have now discovered a novel class of amorphous copolyamides which are based on certain bisimidazolines, dicarboxylic acids, and lactams.

The present copolyamides are possessed of heat resistant properties falling between those of the caprolactam based nylon-6 type materials and the highly aromatic copolyamides of the type disclosed in U.S. Pat. Nos. 4,072,665 and 4,087,481. Because the present copolymers have greater heat resistance than the caprolactam based materials yet are more easily molded, extruded, etc., than the highly aromatic based materials, they provide a highly useful addition to the known polyamides.

It has been found that a certain type of arylene linkage (namely 1,3-arylene) must be present within certain minimum proportions to achieve both the amorphous character and high temperature resistance of the polymers in accordance with this invention. The replacement of the 1,3-arylene linkage by the 1,4-arylene linkage results in the formation of crystalline polymers which are not within the scope of the present invention.

Additionally, the preparation of the present copolyamides is accomplished in an energy efficient process because no complicated operation, such as a dehydration or catalyst removal step, is required. In this same connection, the present polymers are easily prepared without the evolution of troublesome by-products.

SUMMARY OF THE INVENTION

This invention comprises an amorphous copolyamide comprising the reaction product of, A. a lactam having the formula

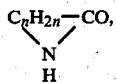

B. a bisimidazoline having the formula

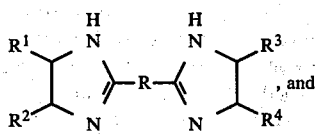

C. A dicarboxylic acid having the formuls

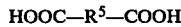

wherein $C_nH_{2n}$ is alkylene having from 5 to 11 carbon atoms in the chain, R is a diradical selected from the group consisting of 1,3-arylene, alkylene having 1 to 12 carbon atoms, inclusive, and cycloalkylene, $R^1$, $R^2$, $R^3$, and $R^4$ are independently selected from the group consisting of hydrogen and inert substituents, and $R^5$ is a diradical selected from the group consisting of 1,3-arylene, alkylene having 4 to 12 carbon atoms, inclusive, and cycloalkylene, provided at least one of the diradicals R and $R^5$ is 1,3-arylene and wherein the proportions of reactants based on 100 mole percent are from about 43 to about 82 mole percent of said lactam and the remaining 18 to 57 mole percent divided between said bisimidazoline and said dicarboxylic acid in substantially equimolar proportions.

The term "inert substituent" means any radical which does not react with any of the components (I), (II) or (III) or otherwise interfere with the formation of said amorphous copolyamides. Illustrative of such inert substituents are lower-alkyl from $C_1$ to $C_4$ such as methyl, ethyl, propyl, butyl, and isomeric forms thereof; lower-alkoxy from $C_1$ to $C_4$ such as methoxy, ethoxy, propoxy, butoxy, and isomeric forms thereof; halo such as fluoro, chloro, bromo, and iodo; alkylmercapto from $C_1$ to $C_4$ such as methylmercapto, ethylmercapto, propylmercapto, butylmercapto, and the like including isomeric forms thereof; and cyano.

The term "1,3-arylene" means the diradical obtained by removing the 1,3-nuclear hydrogen atoms from the same aromatic ring, or equivalent 1,3-nuclear hydrogen atoms from a multi-ring aromatic hydrocarbon; illustrative of such diradicals are 1,3-phenylene, 1,3-naphthylene, and diradicals having the formula

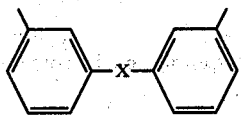

wherein X is selected from the group consisting of a single bond, $-SO_2-$, $-CO-$, $-O-$, and $C_1$ to $C_4$ alkylene. Said arylenes can be unsubstituted or substituted by one or more inert substituents defined above.

The terms "alkylene having 5 to 11, 1 to 12, and 4 to 12 carbon atoms" are inclusive of the following straight or branched chain diradicals having respectively the appropriate number of carbon atoms:- methylene, ethylene, propylene, butylene, pentylene, hexylene, heptylene, octylene, nonylene, decylene, undecylene, dodecylene, and isomeric forms thereof.

The term "cycloalkylene" means a divalent cycloaliphatic radical having 4 to 8 carbon atoms in the ring such as cyclobutylene, cyclopentylene, cyclohexylene, cycloheptylene, cyclooctylene, and the like. The preferred cycloalkylene diradicals have 5 to 7 ring carbon atoms.

The copolyamides prepared in accordance with the present invention can be used as molding powders, for the preparation of fibers and coatings from solution, and for injection molding of articles, and the like. The solid polymers so obtained can be used in bushings, seal faces, electric insulators, impellers, pistons and piston rings, gears, thread guides, cams, brake lining, clutch faces, abrasive articles. Further, the copolyamides of the present invention are useful in wire coating, in casting films, and in spraying polymer films on a variety of substrates such as metal, ceramic, fabrics, polymerics, and the like.

DETAILED DESCRIPTION OF THE INVENTION

The novelty of the present copolyamides resides in the combination of lactam (I), bisimidazoline (II), and dicarboxylic acid (III), defined above and falling within the respective proportions set forth above.

In connection with the mole percent proportions set forth above, they are expressed in terms of the three separate components. That is to say the lactam is present within the mole percent range of about 43 to about 82 and the balance of 18 to 57 is divided essentially equally between the other two components, i.e., from about 9 to about 28.5 mole percent each for the bisimidazoline and dicarboxylic acid.

Preferably the lactam falls within a range of about 60 to about 82 mole percent with the balance of 18 to 40 mole percent comprising the bisimidazoline and dicarboxylic acid in equimolar proportions.

In a separate and preferred embodiment in accordance with the present invention, which will be discussed below, the bisimidazoline and dicarboxylic acid are prereacted to form a salt in a 1:1 molar proportion which is then reacted with lactam. When operating in this mode, the 1:1 salts are considered molar compounds and the above proportions, when recalculated on this basis, become about 60 to about 90 mole percent of lactam (I) with the balance comprising 10 to 40 mole percent of the 1:1 salt of bisimidazoline and dicarboxylic acid.

Accordingly, in the preferred range the lactam is from about 75 to about 90 mole percent with the salt falling within about 10 to about 25 mole percent.

Preferred lactams are those having the formula (I) wherein $C_nH_{2n}$ represents straight chain alkylene having from 5 to 11 carbon atoms, inclusive, and, most preferably, from 5 to 7 carbon atoms, inclusive.

In respect of the bisimidazolines (II), the preferred compounds are those in which the diradical R is 1,3-arylene or alkylene having 1 to 12 carbon atoms and $R_1$, $R_2$, $R_3$ and $R_4$ are each hydrogen. Most preferred of the 1,3-arylenes in the above compounds are those wherein valencies are located on the same ring and most preferred of the alkylenes are the radicals having 2 to 10 carbon atoms, inclusive.

Preferred dicarboxylic acids are those in which the diradical $R^5$ is 1,3-arylene or alkylene having 4 to 12 carbon atoms. Most preferred of the former are the 1,3-arylenes wherein the valencies are both on the same ring and most preferred of the latter are the aklylene radicals having 4 to 10 carbon atoms, inclusive.

As noted previously, at least one of the diradicals R and $R^5$ should have the 1,3-arylene structure in order to achieve the minimum thermal properties of the present copolyamides.

In a preferred embodiment in accordance with the present invention the amorphous copolyamides comprise the reaction product of (a) the lactam (I) wherein $C_nH_{2n}$ represents $-(CH_2)_n-$ and n is an integer from 5 to 7, inclusive, and (b) the 1:1 addition salt of the bisimidazoline (IIa)

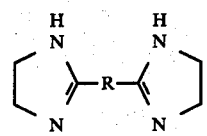

IIa wherein R is a diradical selected from the group consisting of 1,3-arylene and alkylene having 2 to 10 carbon atoms, inclusive, and a dicarboxylic acid selected from the group consisting of a 1,3-arylene dicarboxylic acid and an aliphatic dicarboxylic acid having a $C_4$ to $C_{10}$ alkylene diradical wherein the proportions of reactants based on 100 mole percent are from about 60 to about 90 mole percent of said lactam and the remaining 10 to 40 mole percent of said addition salt.

The polymers in accordance with the present invention are glassy, clear, amorphous polymers which are characterized by the lack of a crysatalline melting point but the presence of a second order glass transition temperature (Tg). Generally speaking, the Tg values for the instant copolyamides fall within the range of from about 50° C. to about 100° C.

The present polymers are characterized by inherent viscosities of at least 0.4 when determined at 0.5 percent concentration in concentrated sulfuric acid at about 30° C.

Additionally, the copolyamides are considered to be random polymers in contrast to block polymers.

Further, and while not intending the present copolyamides to be bound by any theoretical considerations but only by the claims appended hereinbelow, it is believed that the various moieties derived from the lactam, bisimidazoline, and dicarboxylic acid are joined by the carbonamide groups in a variety of linkages, particularly in regard to the sequences which can occur between bisimidazoline with dicarboxylic acid and bisimidazoline with caprolactam.

Also, in spite of the high aromatic content the copolyamides have good solubility in those solvents normally employed for polyamides. Illustrative of such solvents are the phenolic solvents such as meta-cresol, cresylic acid, and the like; polar liquids such as linear or cyclic amides or phosphoramides, for example, N,N-dimethylformamide, N,N-dimethylacetamide, N-methylpyrrolidone, tetramethylenesulfone, and the like. This allows the copolyamides of the present invention to be used in those applications calling for solutions such as in the preparation of films, coatings, lamination, and the like.

The copolyamides in accordance with the present invention can be readily prepared using reaction techniques well known to those skilled in the art for the preparation of polyamides.

Illustratively, the components (I), (II), and (III) are brought together in the molar proportions set forth above in any convenient order in a reaction vessel capable of being heated. Although not absolutely essential, it is preferred that the polymerization be carried out in a sealed reaction vessel or, alternatively, in a reactor under a blanket of inert gas such as nitrogen or argon or, under both of the above conditions.

In a preferred embodiment, the imidazoline and dicarboxylic acid components are brought together first to form the 1:1 salt addition compound or adduct which is then reacted with the lactam. The adduct is prepared using standard methods for the formation of 1:1 salts of diamines and dicarboxylic acids well known to those skilled in the polymer art; for typical methods see Preparative Methods of Polymer Chemistry by W. R. Sorenson and T. W. Campbell, p 61 et seq., 1961, Interscience Publishers, Inc., New York, N.Y.

Advantageously, the polymerization temperature falls within a range of from about 150° C. to about 300° C., and preferably from about 175° C. to about 275° C. The optimum polymerization temperature for any particular combination of reactants can be determined easily by one skilled in the art using a trial and error process.

The components are heated together until the polymerization is judged to be essentially complete. This is readily determined using any of the convenient analytical methods known to those skilled in the art. Infrared spectrum analysis serves as a typical and convenient means to this end. Anaylsis of an aliquot sample of the reaction mass will quickly determine the presence or absence of one of the components, as for example, the bisimidazoline (II).

Generally speaking, the use of a polymerization catalyst is optional but in most cases is preferred. Typical of the catalysts which ca be used are water, and the base metal catalysts generally employed in the polymerization of lactams, and tertiary organic amines.

Illustrative of such base metal catalysts are the alkali metal and alkaline earth metal oxides, hydroxides, carbonates, and the like; e.g. sodium, potassium, rubidium, caesium, magnesium oxides, hydroxides, carbonates, amides and the like.

Illustrative of the tertiary amines are triethylamine, tributylamine, triethylenediamine, and the like.

The preferred catalyst is water.

The amount of catalyst employed can vary over a wide range such as from about 0.5 mole percent to about 10 mole percent based on caprolactam. Preferably however, the amount of catalyst is within the range of about 1 mole percent to about 5 mole percent based on caprolactam.

Overall polymerization times vary depending somewhat on the reactants, temperature employed, etc. Generally speaking, the polymerization time is from about 4 hours to about 24 hours.

If desired, the reaction can be conducted in the presence of an inert solvent but the use of such a solvent is generally unnecessary. The term "inert solvent" means any solvent which does not react with the components (I), (II), or (III), and does not otherwise interfere with the polymerization process.

Illustrative of such solvents are the aromatic solvents such as toluene, xylene, chloro-, and dichlorobenzene, nitrobenzene, and the like; and dipolar aprotic solvents such as dimethylformamide, dimethylacetamide, dimethylsulfone, dimethylsulfoxide, tetramethylenesulfone, and the like.

Generally speaking, when the polymerization mass is cooled to room temperature the copolyamides are obtained directly as glassy solids which can be pulverized, chopped or otherwise broken up to be used directly in a molding or extrusion operation. Alternatively, the glassy polymer may be dissolved in one of the solvents discussed above and used in those applications calling for said polymer solutions.

In the event that any purification of the copolyamides is desired or necessary, the solid product can be pulverized and washed with a non-solvent for the copolyamides. Illustrative of the non-solvents are the aromatic hydrocarbons such as benzene, toluene, xylene, and the like; the lower alcohols such as methanol, ethanol, isopropanol, and the like; halogenated aliphatic solvents such as chloroform, carbon tetrachloride, ethylene dichloride, tetrachloroethane, and the like.

Illustrative of the lactams (I) which can be employed are caprolactam, 4-methylcaprolactam, 4,5-dimethylcarprolactam, 4-ethylcaprolactam, heptanolactam, octanolactam, nonanolactam, decanolactam, undecanolactam, laurolactam, and the like. Preferred are the above cited caprolactams with caprolactam itself being the most preferred. Mixtures of two or more lactams are also contemplated in the present copolyamides.

The bisimidazolines (II) are known compounds which can, for example, be prepared from ethylene diamine or ethylene diamine substituted with the appropriate $R^1$, $R^2$, $R^3$, and $R^4$ and a dinitrile which has the two nitrile groups linked by the diradical which becomes the R in (II); for the preparation of said compounds (II) see Japanese Application 64-24965 (Chem. Abs. 62, 11820d, 1965).

Illustrative but not limiting of the bisimidazolines are 1,3-bis(2-imidazolin-2-yl)benzene, 1,3-bis(5-methyl-2-imidazolin-2-yl)benzene, 1,3-bis(5-ethyl-2-imidazolin-2-yl)benzene, 1,3-bis(5-butyl-2-imidzazolin-2-yl)benzene, 1,3-bis(4,5-dimethyl-2-imidazolin-2-yl)benzene, 1,3-bis(5-chloro-2-imidazolin-2-yl)benzene, 1,3-bis(4,5-dichloro-2-imidazolin-2-yl)benzene, 1,3-bis(2-imidazolin-2-yl)toluene, 1,3-bis(2-imidazolin-2-yl)naphthalene, 1,3-bis(2-imidazolin-2-yl)anisole, 3,3'-bis(2-imidazolin-2-yl)benzophenone, 3,3'-bis(2-imidazolin-2-yl)diphenyl ether, and the like; 2,2'-methylenebis(2-imidazoline), 1,2-bis(2-imidazolin-2-yl)ethane, 1,3-bis(2-imidazolin-2-yl)propane, 1,4-bis(2-imidazolin-2-yl)butane, 1,5-bis(2-imidazolin-2-yl)pentane, 1,6-bis(2-imidazolin-2-yl)hexane, 1,7-bis(2-imidazolin-2-yl)heptane, 1,8-bis(2-imidazolin-2-yl)octane, 1,9-bis(2-imidazolin-2-yl)nonane, 1,10-bis(2-imidazolin-2-yl)decane, 1,11-bis(2-imidazolin-2-yl)undecane, 1,12-bis(2-imidazolin-2-yl)dodecane, 1,3-bis(2-imidazolin-2-yl)-2,2-dimethylpropane, 1,3-bis(2-imidazolin-2-yl)-1-methylpropane, 1,4-bis(4-chloro-2-imidazolin-2-yl)butane, 1,4-bis(4-methyl-2-imidazolin-2-yl)butane, and the like; 1,3-bis(2-imidazolin-2-yl)cyclobutane, 1,3-bis(2-imidazolin-2-yl)cyclopentane, 1,3-bis(4-methyl-2-imidazolin-2-yl)cyclopentane, 1,3-bis(2-imidazolin-2-yl)-4-methylcyclopentane, 1,4-bis(2-imidazolin-2-yl)cyclohexane, 1,4-bis(4-ethyl-2-imidazolin-2-yl)cyclohexane, 1,4-bis(2-imidazolin-2-yl)cycloheptane, 1,4-bis(2-imidazolin-2-yl)cyclooctane, 1,5-bis(2-imidazolin-2-yl)cyclooctane, and the like. The use of mixtures of two or more bisimidazolines can be employed in the preparation of the copolyamides of the invention.

Preferred amongst the imidazolines above are the 1,3-bis(2-imidazolin-2-yl)benzenes set forth above, and the 1,2- to 1,10-bis(2-imidazolin-2-yl)alkanes set forth above.

Most preferred are 1,3-bis(2-imidazolin-2-yl)benzene, 1,4-bis(2-imidazolin-2-yl)butane, and 1,10-bis(2-imidazolin-2-yl)decane.

Illustrative but not limiting of the dicarboxylic acids are isophthalic acid, 5-methyl isophthalic acid, 4,5-dimethyl isophthalic acid, 5-chloroisophathalic acid, 1,3-naphthalene dicarboxylic acid, 3,3'-bis(carboxy)benzophenone, 3,3'-bis(carboxy)diphenyl ether, and the like; adipic, pimelic, suberic, azelaic, sebacic, brassylic, 1,12-dodecanedioic, α-methyladipic, β-methyladipic, α,α-diethyladipic, and the like acids; 1,3-cyclobutanedicarboxylic acid, 1,3-cyclopentanedicarboxylic acid, 4-methyl-1,3-cyclopentanedicarboxylic acid, 1,4-cyclohexanedicarboxylic acid, 1,3-cyclohexanedicarboxylic acid, 2-methyl-1,4-cyclohexanedicarboxylic acid, 1,4-cycloheptanedicarboxylic acid, 1,4-cyclooctanedicarboxylic acid, and the like. Mixtures of dicarboxylic acids can be employed in the present copolyamides.

Preferred amongst the dicarboxylic acids above are the isophthalic acids and the alkylenedicarboxylic acids.

Additives such as antioxidants, dyes, fire retardants, and the like may be added to solutions of the polymers of the present invention in solvents of the type set forth above. Alternatively, the additives may be added to the dry powdered polymers either prior to, or during, processing steps such as molding, extruding, injection molding, and the like.

The copolyamides in accordance with the present invention enjoy the added benefit that they need no dehydration step either during their preparation or when they are being isolated or purified.

The following preparations and examples describe the manner and process of making and using the invention and set forth the best mode contemplated by the inventors of carrying out the invention but are not to be construed as limiting.

EXAMPLE 1

(a) A 500 ml reaction flask equipped with a stirrer, thermometer, and reflux condenser was charged with 16.9 g (0.09 mole) of azelaic acid, 19.2 g (0.09 mole) of 1,3-bis(2-imidazolin-2-yl)benzene, and 150 ml of absolute ethanol. The mixture was heated at reflux (about 78° C.) until most of the solid had dissolved. The hot solution was filtered and cooled to room temperature whereupon a crystalline solid precipitated.

The solid was collected by suction filtration, washed with fresh ethanol, and dried to provide 31.5 g (85% yield) of the salt formed from the imidazoline and azelaic acid in a 1:1 molar proportion; m.p. 165°–167° C.; structure confirmed by NMR analysis to be

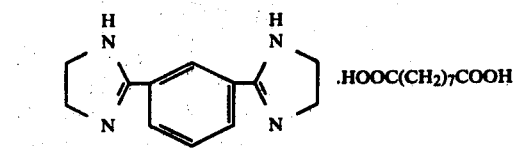

(hereinafter referred to as 1,3 BIB.Az.). (b) A 6 g (0.0531 mole) sample of caprolactam along with 3 g (0.0075 mole) of the 1,3 BIB.Az salt above, and 0.02 g (0.2% by wt. of ingredients) of water were mixed and sealed under nitrogen in a pyrex ampoule. The ampoule was heated in an oil bath at about 245° C. for about 16 hours.

The ampoule was opened after cooling to provide a glassy amorphous copolyamide in accordance with the present invention; inherent viscosity (0.5 precent in conc. sulfuric acid at 30° C.) was found to be 0.79; differential scanning calorimetry (DSC) on a sample under nitrogen, using a DuPont 990 Thermal Analyzer equipped with a DuPont 910 DSC module, and a heating rate of 10° per minute, showed a Tg=60° C., and no crystalline melt.

Using the method and ingredients described above in the initial run, except for the use of higher concentration of water at a 0.4% level, and the ingredients in the proportions set forth in Table I, there were prepared non-crystalline copolyamides in accordance with the present invention in runs 4 through 8, inclusive, and crystalline copolyamides not so in accordance in comparison runs 2, 3 and 9.

The polymers from runs 4 through 8 were transparent glassy amorphous and showed no Tm when tested by DSC whereas comparison runs 2, 3 and 9 produced cloudy opaque crystalline polymers having the Tm values set forth in Table I.

TABLE I

| Run | wt. ratio salt:lactam | mole % salt:lactam | 30° C. $\eta$0.5($H_2SO_4$) | Tg(°C.) | Tm (°C.) |
|---|---|---|---|---|---|
| 2 | 1:0 | 100:0 | 0.34 | 85 | 260 |
| 3 | 1:0.1 | 74:26 | 0.34 | 80 | 250 |
| 4 | 1:0.37 | 43:57 | 0.41 | 80 | none |
| 5 | 1:0.65 | 30:70 | 0.54 | — | none |

TABLE I-continued

| Run | wt. ratio salt:lactam | mole % salt:lactam | 30° C. η0.5(H₂SO₄) | Tg(°C.) | Tm (°C.) |
|---|---|---|---|---|---|
| 6 | 1:1 | 22:78 | 0.66 | 60 | none |
| 7 | 1:1.5 | 16:84 | 0.73 | — | none |
| 8* | 1:2 | 12:88 | 0.79 | 60 | none |
| 9 | 1:3 | 9:91 | 0.87 | 45 | 177 |

*Repetition of first run except for the use of 0.4% by weight of water instead of the 0.2% proportion used in the initial run above.

EXAMPLE 2

(a) Using the apparatus and procedure set forth in Example 1(a), 14.6 g (0.1 mole) of adipic acid and 21.4 g (0.1 mole) of 1,3,-bis(2-imidazolin-2-yl)benzene were heated together with 200 ml of absolute ethanol until all the solid dissolved. The hot solution was filtered and cooled which resulted in the precipitation of a solid.

The solid was collected, washed with fresh ethanol and dried to provide 32 g (89% yield) of the 1:1 salt; m.p. 190°-192° C.; structure confirmed by NMR analysis to be

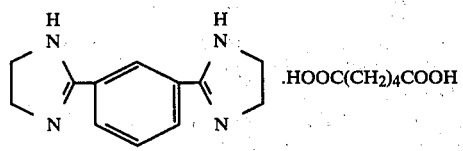

(hereinafter referred to as 1,3 BIB.Ad).

(b) Using the method and ingredients described in Example 1(b) except that the 1,3 BIB.Az salt was replaced by the 1,3 BIB.Ad salt above, and, the ingredients in the proportions set forth in Table II, there were prepared two non-crystalline transparent amorphous copolyamides in accordance with the present invention in runs 10 and 11, and a comparison crystalline polymer in run 12.

The two polymers in accordance with the invention exhibited no Tm when subjected to DSC analysis while showing relatively high Tg.

TABLE II

| Run | wt. ratio salt:lactam | mole % salt:lactam | 30° C. η0.5(H₂SO₄) | Tg(°C.) | Tm (°C.) |
|---|---|---|---|---|---|
| 10 | 1:1 | 24:76 | — | 73 | none |
| 11 | 1:2 | 14:86 | 0.70 | 55 | none |
| 12 | 1:3 | 9:91 | 0.52 | 40 | 175 |

EXAMPLE 3

(a) Using the apparatus and procedure set forth in Example 1(a), 3.32 g (0.02 mole) of isophthalic acid and 4.28 g (0.02 mole) of 1,3-bis(2-imidazolin-2-yl)benzene were heated together with 150 ml of refluxing absolute ethanol which resulted in the immediate precipitation of a crystalline solid.

The solid was collected by suction filtration, washed with fresh ethanol, and dried to provide 7 g (93% yield) of the 1:1 salt; m.p. about 280° C. and not well defined; structure confirmed by NMR analysis to be

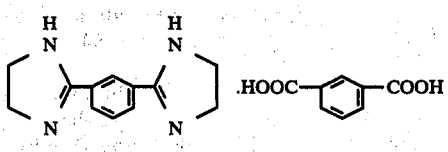

(hereinafter referred to as 1,3 BIB.I).

(b) Using the method and ingredients described in Example 1(b) except that the 1,3 BIB.Az salt was replaced by the 1,3 BIB.I salt prepared above, and, the ingredients in the proportions set forth in Table III, there were prepared two non-crystalline transparent amorphous copolyamides from runs 13 and 14 in accordance with the present invention. Comparison run 15 was a crystalline polymer.

The two polymers in accordance with the invention exhibited no Tm when subjected to DSC analysis while showing relatively high Tg values, particularly in run 13.

TABLE III

| Run | wt. ratio salt:lactam | mole % salt:lactam | 30° C. η0.5(H₂SO₄) | Tg(°C.) | Tm (°C.) |
|---|---|---|---|---|---|
| 13 | 1:1 | 23:77 | 0.41 | 100 | none |
| 14 | 1:2 | 13:87 | 0.47 | 75 | none |
| 15 | 1:4 | 7:93 | — | — | 190 |

We claim:

1. An amorphous moldable copolyamide comprising the reaction product of,

A. a lactam having the formula

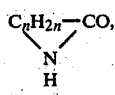

B. a bisimidazoline having the formula

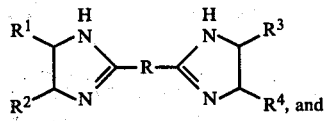

C. a dicarboxylic acid having the formula $$HOOC-R^5-COOH$$

wherein $C_nH_{2n}$ is alkylene having from 5 to 11 carbon atoms in the chain, R is a diradical selected from the group consisting of 1,3-arylene, alkylene having 1 to 12 carbon atoms, inclusive, and cycloalkylene, $R^1$, $R^2$, $R^3$, and $R^4$ are independently selected from the group consisting of hydrogen and inert substituents, and $R^5$ is a diradical selected from the group consisting of 1,3-arylene, alkylene having 4 to 12 carbon atoms, inclusive, and cycloalkylene, provided at least one of the diradicals R and $R^5$ is 1,3-arylene and wherein the proportions of reactants based on 100 mole percent are from about 43 to about 82 mole percent of said lactam and the remaining 18 to 57 mole percent divided between said bisimidazoline and said dicarboxylic acid in substantially equimolar proportions.

2. A copolyamide according to claim 1 wherein said lactam has the formula

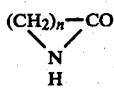

wherein n is an integer from 5 to 11, inclusive.

3. A copolyamide according to claim 2 wherein said lactam is caprolactam.

4. A copolyamide according to claim 1 wherein $R^1$, $R^2$, $R^3$ and $R^4$ in said bisimidazoline are all hydrogen.

5. A copolyamide according to claim 1 wherein the diradical R in said bisimidazoline is 1,3-arylene.

6. A copolyamide according to claim 1 wherein the diradical R in said bisimidazoline is alkylene having 1 to 12 carbon atoms, inclusive.

7. A copolyamide according to claim 1 wherein the diradical $R^5$ in said dicarboxylic acid is 1,3-arylene.

8. A copolyamide according to claim 1 wherein the diradical $R^5$ in said dicarboxylic acid is alkylene having 4 to 12 carbon atoms, inclusive.

9. An amorphous moldable copolyamide comprising the reaction product of,

A. a lactam having the formula

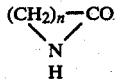

wherein n is an integer from 5 to 7, inclusive; and

B. the 1:1 addition salt of:

1. a bisimidazoline having the formula

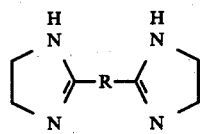

wherein R is a diradical selected from the group consisting of 1,3-arylene and alkylene having 2 to 10 carbon atoms, inclusive, and 2. a dicarboxylic acid selected from the group consisting of a 1,3-arylene dicarboxylic acid and an aliphatic dicarboxylic acid having a $C_4$ to $C_{10}$ alkylene diradical, wherein the proportions of reactants based on 100 mole percent are from about 60 to about 90 mole percent of said lactam and the remaining 10 to 40 mole percent comprises said addition salt.

10. A copolyamide according to claim 9 wherein said lactam is caprolactam.

11. A copolyamide according to claim 9 wherein (1) is 1,3-bis(2-imidazolin-2-yl)benzene and (2) is azelaic acid.

12. A copolyamide according to claim 9 wherein (1) is 1,3-bis(2-imidazolin-2-yl)benzene and (2) is adipic acid.

13. A copolyamide according to claim 9 wherein (1) is 1,3-bis(2-imidazolin-2-yl)benzene and (2) is isophthalic acid.

14. A copolyamide according to claim 11, 12, or 13 wherein said lactam is caprolactam.

* * * * *